United States Patent [19]
Balakrishnan

[11] Patent Number: 5,014,178
[45] Date of Patent: May 7, 1991

[54] SELF POWERING TECHNIQUE FOR INTEGRATED SWITCHED MODE POWER SUPPLY

[75] Inventor: Balu Balakrishnan, Saratoga, Calif.
[73] Assignee: Power Integrations, Inc., Mountain View, Calif.
[21] Appl. No.: 522,557
[22] Filed: May 14, 1990
[51] Int. Cl.$^5$ .............................................. H02M 3/335
[52] U.S. Cl. ........................................ 363/49; 363/21; 363/97
[58] Field of Search .............................. 363/21, 49, 97

[56] References Cited

U.S. PATENT DOCUMENTS 4,695,936  9/1987  Whittle ................................... 363/21
4,887,199 12/1989  Whittle ................................... 363/49

Primary Examiner—Peter S. Wong
Assistant Examiner—Bruce Dunn
Attorney, Agent, or Firm—Thomas E. Schatzel

[57] ABSTRACT

A regulator circuit is connected to a transformer. The transformer has a primary winding connected to a rectified D.C. voltage signal and has a feedback winding. A feedback capacitor is coupled across the feedback winding of the capacitor. The regulator circuit includes a high voltage switching transistor, a pulse width modulator which controls the high voltage switching transistor and a high voltage power up transistor. At power up, the high voltage power up transistor connects the single high voltage pin to the feedback capacitor allowing the feedback capacitor to begin charging. When the feedback capacitor has charged past a first threshold voltage the pulse width modulator alternately turns the high voltage switching transistor on and off. When the high voltage switching transistor is turned on, the high voltage pin is connected to ground and current passes through the primary winding of the transformer, and thus current is generated through the feedback winding into the feedback capacitor. Additionally, when the high voltage power up transistor is on, the gate of the high voltage power up transistor is connected to ground turning the high voltage power up transistor off. Once the feedback capacitor has been charged to a second threshold voltage a transistor connects the gate of the high voltage power up transistor to ground thus permanently switching the high voltage power up transistor off.

7 Claims, 1 Drawing Sheet

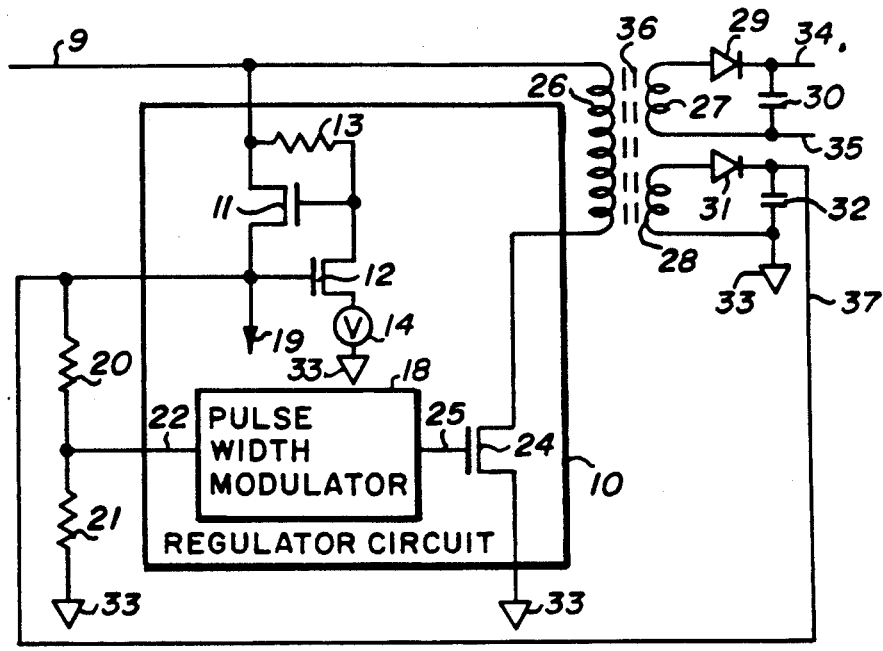
*Fig_1*
(PRIOR ART)
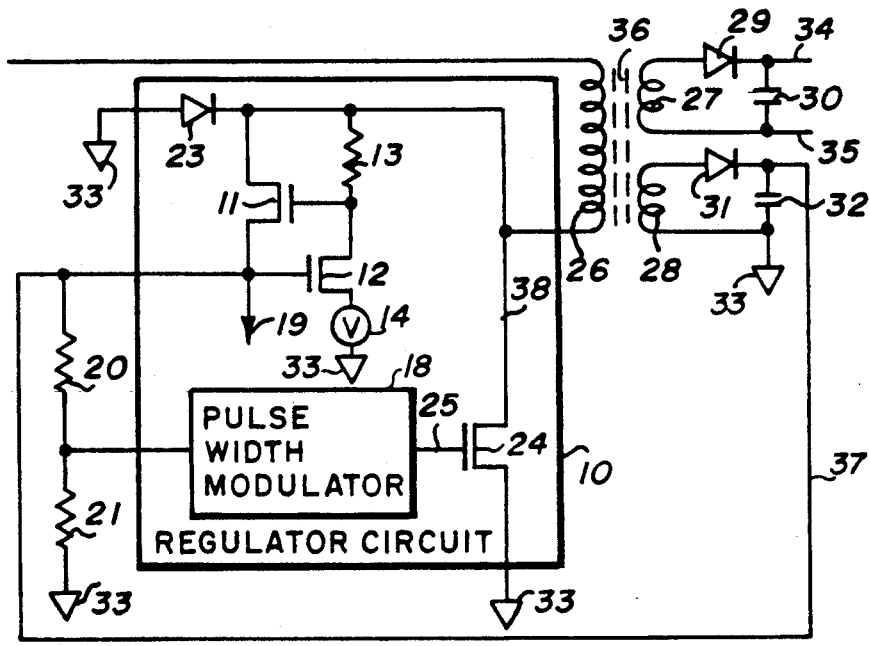
*Fig_2*
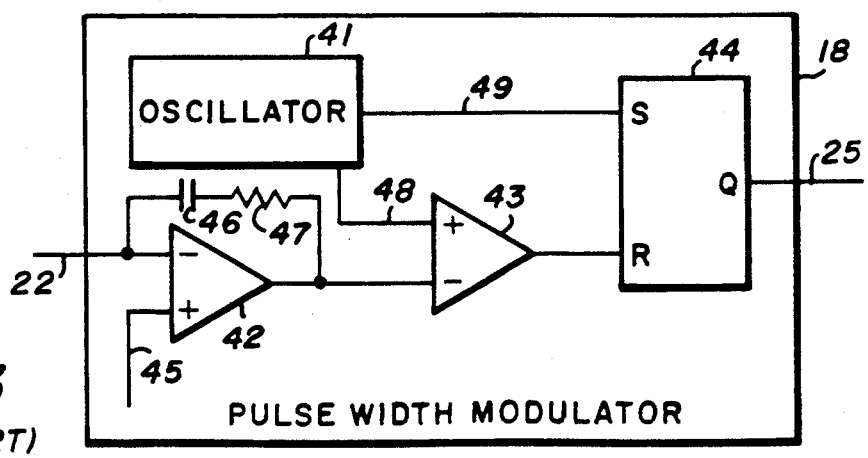
*Fig_3*
(PRIOR ART)

SELF POWERING TECHNIQUE FOR INTEGRATED SWITCHED MODE POWER SUPPLY

BACKGROUND

The present invention concerns a technique for initializing an integrated switched mode power supply.

A flyback power supply with an offline regulator circuit may typically use a high voltage switching transistor within an integrated circuit to control current through the primary winding of a transformer, thereby regulating a second voltage across the secondary winding of the transformer. At power-up of the power supply, it is necessary to initialize the regulator circuit and the high voltage switching transistor thereon. Typically this is done with start-up circuitry within the regulator circuit. The start-up circuitry may typically include a high voltage power up transistor and require a separate high voltage pin which is connected to an off-circuit high voltage D.C. source.

The addition of a high voltage power up transistor and associated separate high voltage pin has severe disadvantages. For example, the integrated circuit has to be designed so that the high voltage pins are spaced at sufficient distance to prevent current creepage between them. Further, it is desirable to design the high voltage power up transistor so that it is small and thus allows only a few milliamps of current. However, small high voltage transistors are difficult to protect against electric static discharge.

SUMMARY OF THE INVENTION

In accordance with the preferred embodiment of the present invention, a regulator circuit connected to a transformer is presented. The transformer has a primary winding connected to a rectified D.C. voltage signal and has a feedback winding. A feedback capacitor is coupled across the feedback winding of the transformer. The regulator circuit includes a high voltage switching transistor, a pulse width modulator which controls the high voltage switching transistor and a high voltage power up transistor. The drain of the high voltage switching transistor and the drain of the high voltage power up transistor are connected together, eliminating the need for a separate high voltage pin for the high voltage power up transistor.

At power up, the high voltage power up transistor connects the single high voltage pin to the feedback capacitor allowing the feedback capacitor to begin charging. When the feedback capacitor has charged past a first threshold voltage the pulse width modulator alternately turns the high voltage switching transistor on and off. When the high voltage switching transistor is turned on, the high voltage pin is connected to ground and current passes through the primary winding of the transformer, and thus current is generated through the feedback winding into the feedback capacitor. Additionally, when the high voltage power up transistor is on, the gate of the high voltage power up transistor is connected to ground turning the high voltage power up transistor off. Once the feedback capacitor has been charged to a second threshold voltage a transistor connects the gate of the high voltage power up transistor to ground thus permanently switching the high voltage power up transistor off. Once the high voltage power up transistor is off, the voltage across the feedback capacitor is used to supply power to the regulator circuit.

The invention eliminates the need for a second high voltage pin and reduces the associated creepage distance required by high voltage pins. Further, since the high voltage switching transistor is connected to the high voltage pin, this provides the high voltage power up transistor with a high level of protection against electrostatic discharge.

These and other objects and advantages of the present invention will no doubt become obvious to those of ordinary skill in the art after having read the following detailed description of the preferred embodiment which is illustrated in the various drawing figures.

BRIEF DESCRIPTION OF THE DRAWINGS

FIG. 1 is a prior art flyback power supply with a voltage regulator.

FIG. 2 shows a flyback power supply with a voltage regulator in accordance with the preferred embodiment of the present invention.

FIG. 3 is a detailed block diagram of a pulse width modulator within both the circuit shown in FIG. 1 and the circuit shown in FIG. 2.

DESCRIPTION OF THE PRIOR ART

In FIG. 1, a prior art flyback power supply with a voltage regulator is shown. A high voltage switching transistor 24 within a regulator circuit 10 is used to control current through a primary winding 26 of a transformer 36. Current through a secondary winding 27 and a diode 29 are used to charge a capacitor 30 so as to provide a power supply output voltage between lead 34 and lead 35.

Current through another secondary winding 28 and a diode 31 are used to charge a capacitor 32 so as to provide a feedback voltage between a system reference voltage 33 (i.e., ground) and a line 37. The feedback voltage on line 37 is divided by a voltage divider consisting of resistor 20, a resistor 21 before being received by a pulse width modulator 18 on an input line 22.

Pulse width modulator 18 generates a control signal on a line 25 which is connected to the gate of high voltage switching transistor 24. Typically, line 25 is oscillated at a frequency and duty cycle sufficient to keep a power supply output voltage between lead 34 and lead 35 at a selected voltage, for example five volts. When the power supply output voltage between lead 34 and lead 35 is at five volts, other typical values for the circuit are as follows. Capacitor 30 is, for example, 4.7 microfarads. Capacitor 32 is, for example, 0.1 microfarads. Resistor 20 is, for example, 341 kilohms. Resistance 21 is, for example, 63.5 kilohms. The feedback voltage between system reference voltage 33 and line 37 is, for example, 8.5 volts.

Line 37 is additionally connected inside regulator circuit 10 to a line 19. Line 19 provides internal low voltage power to regulator chip 10.

For the circuit in FIG. 1, a high voltage power up transistor 11 is used to initialize regulator circuit 10 at power up. At power up, a rectified D.C. voltage signal is placed on line 9. Typically the voltage may be from 50 volts to 400 volts. Initially transistor 11 is turned on and brings line 19 to the internal low voltage power by charging capacitor 32. During power-up, current flow through high voltage power up transistor 11 is in the range of 5 to 15 milliamps. Once line 19 reaches a threshold voltage, typically about 6 volts, pulse width modulator 18 begins functioning. This results in high voltage switching transistor 24 producing a pulse width modulated signal which stabilizes the voltage on line 37 to the preselected operating voltage.

When the voltage on line 19 is close to its operating voltage of 8.5 volts, transistor 12 is turned on. A threshold voltage from voltage source 14, for example six volts, is then connected to the gate of transistor 11, switching transistor 11 off. A resistor 13, for example, having a resistance of 400 kilohms, is connected to high voltage power up transistor 11 as shown.

DESCRIPTION OF THE PREFERRED EMBODIMENT

FIG. 2 shows regulator circuit 10 modified in accordance with the preferred embodiment of the present invention. As in FIG. 1, high voltage switching transistor 24 is used to control current through primary winding 26 of transformer 36. Current through secondary winding 27 and diode 29 are used to charge capacitor 30 so as to provide a power supply output voltage between lead 34 and lead 35.

Current through secondary winding 28 and diode 31 are used to charge capacitor 32 so as to provide a feedback voltage between system reference voltage 33 and line 37. The feedback voltage on line 37 is divided by a voltage divider consisting of resistor 20 and a resistor 21. Pulse width modulator 18 switches high voltage switching transistor 24 so that the power supply output voltage remains constant at 5 volts.

During initialization, high voltage switching transistor 24 is off. The drain of high voltage power up transistor 11 is connected to the rectified voltage D.C. signal through primary winding 26 of transformer 36 at a line 38. High voltage power up transistor 11 is on and current through high voltage power up transistor 11 begins charging capacitor 32. As shown, a drain source diode 23 of high voltage power up transistor 11 is connected to reference voltage 33.

When the the voltage on line 37 reaches approximately six volts, pulse width modulator 18 begins switching high voltage switching transistor 24. When high voltage switching transistor 24 is turned "ON" line 37 goes to approximately zero volts. At this condition, high voltage power up transistor 11 becomes a reverse transistor, that is the source and drain of high voltage power up transistor 11 are reversed. The source and gate of high voltage power up transistor 11 are thus set at approximately zero volts and the drain is at approximately six volts. This results in high voltage power up transistor 11 being turned off. This prevents capacitor 32 from being discharged through high voltage power up transistor 11. Pulse width modulator is designed to have a maximum 50% duty cycle; therefore, high voltage power up transistor 11 is able to continue charging capacitor 32, until the voltage on line 37 reaches a threshold voltage, typically about eight volts, sufficient to turn on transistor 12. When transistor 12 is turned on, the threshold voltage from voltage source 14 is connected to the gate of high voltage power up transistor 11. High voltage power up transistor 11 is thus turned off and the regulator circuit proceeds with normal operation.

FIG. 3 shows details of pulse width modulator 18. Pulse width modulator 18 consists of, for example, an error amplifier 42, a comparator 43, an oscillator 41 and an SR flip-flop 44 connected as shown. A capacitor having a value of, for example 100 picofarads, and a resistor having a value of, for example 37.5 kilohms, are connected to error amplifier 42 as shown. A threshold voltage of, for example 1.27 volts, is placed on an input 45 of error amplifier 42. Oscillator 41 generates a square wave output signal on a line 49 and generates a sawtooth wave output signal on a line 48.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. A regulator circuit connected to a transformer, the transformer having a first terminal of a primary winding connected to a rectified D.C. voltage signal, and a feedback winding, a feedback capacitor in series with a rectifier diode being coupled across the feedback winding of the transformer, the regulator circuit comprising:

a high voltage switching transistor, having a gate and a drain, the drain being coupled to a second terminal of the primary winding of the transformer;

switching means, coupled to the gate of the high voltage switching transistor, for switching the high voltage switching transistor on and off at a duty cycle, the duty cycle varying with a voltage level across the feedback capacitor; and, high voltage power up transistor having a drain coupled to the drain of the high voltage switching transistor, having a gate, coupled through a resistance to the drain of the high voltage power up transistor, and having a source coupled to the feedback coupler.

2. A regulator circuit as in claim 1, additionally comprising a drain source diode coupled to the drain of the high voltage power up transistor and to a ground.

3. A regulator circuit as in claim 1 additionally comprising a transistor having a gate coupled to the feedback capacitor, having a drain coupled to the gate of the high voltage power up transistor and having a source coupled to a threshold voltage source.

4. A regulator circuit, as in claim 1, wherein the switching means is a pulse width modulator coupled to the feedback capacitor through a voltage divider.

5. A regulator circuit as in claim 1, wherein the transformer additionally has a secondary winding connected to a capacitance, a voltage across the capacitance acting as a power supply output voltage.

6. A regulator as in claim 5, wherein the capacitance connected to the secondary winding is in series with a rectifier diode.

7. In a power supply, a method for initializing voltage across a feedback capacitor by use of a regulator circuit with only a single high voltage pin, the single high voltage pin being coupled to a primary winding of a transformer, the feedback capacitor being coupled across a feedback winding of a transformer and the primary winding being coupled to a rectified D.C. voltage signal, the method comprising the steps of:

(a) electrically connecting the single high voltage pin to the feedback capacitor allowing the feedback capacitor to begin charging;

(b) when the feedback capacitor has charged past a first threshold voltage, alternately electrically connecting and disconnecting the single high voltage pin to ground so that when the single high voltage pin is electrically connected to ground the single high voltage pin is disconnected from the feedback capacitor;

(c) when the feedback capacitor has charged past a second threshold voltage, maintaining the single high voltage pin disconnected from the feedback capacitor.

* * * * *